USO08468081B2

(12) United States Patent
Bonner et al.

(10) Patent No.: US 8,468,081 B2
(45) Date of Patent: Jun. 18, 2013

(54) PRIVATE COMPANY VALUATION

(75) Inventors: John F. Bonner, Cham (CH); Evan T. Riles, Zurich (CH); George P. Bonne, San Jose, CA (US)

(73) Assignee: Thomson Reuters Global Resources, Baar (CH)

( * ) Notice: Subject to any disclaimer, the term of this patent is extended or adjusted under 35 U.S.C. 154(b) by 33 days.

(21) Appl. No.: 12/959,658

(22) Filed: Dec. 3, 2010

(65) Prior Publication Data

US 2012/0143782 A1 Jun. 7, 2012

(51) Int. Cl.
*G06Q 40/00* (2006.01)
(52) U.S. Cl.
USPC .......................................... 705/36 R; 705/37

(58) Field of Classification Search
USPC ....................................................... 705/35–40
See application file for complete search history.

(56) References Cited

U.S. PATENT DOCUMENTS

2005/0071217 A1 * 3/2005 Hoogs et al. ..................... 705/10

* cited by examiner

*Primary Examiner* — Thu Thao Havan
(74) *Attorney, Agent, or Firm* — Bartholomew J. DiVita; Alexander Migirov

(57) ABSTRACT

Systems and techniques are disclosed to value privately-held companies, at least in part, on publicly traded companies. A value is computed for a primary private company using a weighted average valuation multiple and a weighted average total return value associated with publicly traded companies. A confidence rating of the computed valuation is also provided.

62 Claims, 10 Drawing Sheets

| Description Details | | Company Details | USD millions | | | | |
|---|---|---|---|---|---|---|---|
| Country | USA | Income Statement | 2008 | 2009 | Q1-2009 | Q1-2010 | LTM |
| | | Total Revenue | 5,226 | 3,508 | 840 | 1,020 | 3,688 |
| Description | Target Semiconductor is a global leader in the design | Cost of Goods Sold | 3,154 | 2,563 | 664 | 651 | 2,550 |
| | and manufacture of embedded semiconductors for the | Gross Profit | 2,072 | 945 | 176 | 369 | 1,138 |
| | automotive, consumer, industrial and networking | | | | | | |
| | markets. The privately held company is based in New York, | SG&A | 673 | 499 | 137 | 117 | 479 |
| | and has design, research and development, | R&D | 1,140 | 833 | 244 | 191 | 780 |
| | manufacturing or sales operations around the world. | Amortization expenses | 1,042 | 486 | 122 | 121 | 485 |
| | | Reorg of business | 53 | 345 | 24 | 1 | 322 |
| | | Impairment of Goodwill | 6,981 | - | - | - | - |
| TRBC | Semiconductors | Merger Expenses | 11 | - | | | |
| | | Total Operating Expenses | 9,900 | 2,163 | 527 | 430 | 2,066 |
| Status | Private - LBO | | | | | | |
| | | Operating Profit | (7,828) | (1,218) | (351) | (61) | (928) |
| Acquired | 9/15/2006 | | | | | | |
| | | Gain on extinguishment of l-t debt | 79 | 2,296 | 2,264 | (47) | (15) |
| Deal Value | 17,704 | Other expense, net | (733) | (576) | (168) | (153) | (561) |
| | | | | | | | |
| | | Pre Tax Profit | (8,482) | 502 | 1,745 | (261) | (1,504) |
| | | Tax Expense/(Benefit) | (543) | (246) | (11) | (4) | (239) |
| | | Net Income/(Loss) | (7,939) | 748 | 1,756 | (257) | (1,265) |
| | | | | | | | |
| | | EBITDA | (5,955) | 2,251 | 2220 | 140 | 171 |
| | | Adjusted EBITDA | | | | | 759 |
| | | | | | | | |
| | | Balance Sheet | 2008 | 2009 | | | Q1-2009 |
| | | Cash | 900 | 1,363 | | | 1,191 |
| | | S-T Investments | 494 | - | | | |
| | | AR | 394 | 379 | | | 432 |
| | | Inventory | 755 | 606 | | | 617 |
| | | Other Current Assets | 452 | 335 | | | 326 |
| | | Total Short-Term Assets | 2,995 | 2,683 | | | 2,566 |
| | | | | | | | |
| | | PP&E | 1,931 | 1,315 | | | 1,234 |
| | | Intangible Assets | 1,264 | 780 | | | 657 |
| | | Other Assets | 461 | 315 | | | 337 |
| | | Total Long-Term Assets | 3,656 | 2,410 | | | 2,228 |
| | | | | | | | |
| | | Total Assets | 6,651 | 5,093 | | | 4,794 |
| | | | | | | | |
| | | Notes payable and current L-T | 163 | 114 | | | 96 |
| | | Accounts Payable | 246 | 300 | | | 355 |
| | | Accrued Liabilities | 595 | 481 | | | 494 |
| | | Total Current Liabilities | 1,004 | 895 | | | 945 |
| | | | | | | | |
| | | Long-Term Debt | 9,610 | 7,430 | | | 7,378 |
| | | Deferred Tax Liabilities | 376 | 131 | | | 130 |
| | | Other Liabilities | 353 | 531 | | | 486 |
| | | | | | | | |
| | | Stockholder's Deficit | (4,692) | (3,894) | | | (4,145) |
| | | | | | | | |
| | | Total Liabilities and Equity | 6,651 | 5,093 | | | 4,794 |

FIG. 3

Target Semiconductor, Inc.
Comparable Company Analysis (Pvt to Public)

| | | Research 15% | TRBC 5% | News 5% | Competitor DB 25% | StreetEvents Transcript 20% | Fairness Opinion 30% | Ranking |
|---|---|---|---|---|---|---|---|---|
| Texas Instruments Incorporated | TXN-US | 1.00 | 1.00 | | 1.00 | 1.00 | 1.00 | 0.95 |
| Infineon Technologies | IFX-XE | 1.00 | | | 1.00 | | 1.00 | 0.70 |
| STMicroelectronics | STM-US | 1.00 | | | 1.00 | | 1.00 | 0.70 |
| Renesas Electronics | 6723-TO | 1.00 | | | | 1.00 | 1.00 | 0.65 |
| Intel Corporation | INTC-US | 1.00 | 1.00 | | 1.00 | 1.00 | | 0.65 |
| LSI Corporation | LSI-US | 1.00 | 1.00 | | | | 1.00 | 0.50 |
| Analog Devices, Inc. | ADI-US | 1.00 | 1.00 | | 1.00 | | | 0.45 |
| Atmel Corporation | ATML-US | 1.00 | 1.00 | | 1.00 | | | 0.45 |
| Broadcom Corporation | BRCM-US | 1.00 | 1.00 | | 1.00 | | | 0.45 |
| Microchip Technology Inc. | MCHP-US | 1.00 | 1.00 | | 1.00 | | | 0.45 |
| Cypress Semiconductor Corporation | CY-US | | 1.00 | | | | 1.00 | 0.35 |
| Cavium Networks, Inc. | CAVM-US | | 1.00 | | 1.00 | | | 0.30 |
| Advanced Micro Devices, Inc. | AMD-US | 1.00 | 1.00 | | | | | 0.20 |
| Amkor Technology, inc. | | 1.00 | 1.00 | | | | | 0.20 |
| Intersil Corporation | | 1.00 | 1.00 | | | | | 0.20 |
| Linear Technology Corporation | | 1.00 | 1.00 | | | | | 0.20 |
| Maxim Integrated Products Inc. | | 1.00 | 1.00 | | | | | 0.20 |
| IBM | | 1.00 | | | | | | 0.15 |

Fig. 5

Freescale Semiconductor, Inc.
Comparable Company Analysis (Pvt to Public)

| | | Revenue | Revenue -1 | Revenue Growth | Operating Profit | Operating Margin | Net Income | Net Margin | Revenue 25% | Revenue Growth 35% | Operating Margin 30% | Net Margin 10% | Ranking |
|---|---|---|---|---|---|---|---|---|---|---|---|---|---|
| Freescale | | 3,508 | 5,226 | -33% | (1,218) | -35% | 748 | 21% | | | | | |
| Texas Instruments Incorporated | TXN-US | 10,427 | 12,501 | -17% | 2,203 | 21% | 1,470 | 14% | 0.51 | 2.02 | 0.36 | 2.05 | 1.13 |
| Infineon Technologies | IFX-XE | 4,425 | 6,069 | -27% | (364) | -8% | (911) | -21% | 3.83 | 5.69 | 1.43 | 0.51 | 3.00 |
| STMicroelectronics | STM-US | 8,510 | 9,842 | -14% | (1,034) | -12% | (1,131) | -13% | 0.70 | 1.70 | 6.62 | 0.62 | 0.83 |
| Renesas | 6723-TO | 5,041 | 5,533 | -9% | (527) | -10% | (604) | -12% | 2.29 | 1.37 | 1.76 | 0.64 | 1.12 |
| Intel Corporation | INTC-US | 35,127 | 37,586 | -7% | 7,456 | 21% | 4,369 | 12% | 0.11 | 1.25 | 0.14 | 2.40 | 0.79 |
| LSI Corporation | LSI-US | 2,219 | 2,677 | -17% | (91) | -4% | (48) | -2% | 2.72 | 2.08 | 1.08 | 0.91 | 1.50 |
| Analog Devices, Inc. | ADI-US | 2,015 | 2,583 | -22% | 350 | 17% | 248 | 12% | 2.35 | 3.02 | 0.78 | 2.36 | 1.98 |
| Atmel Corporation | ATML-US | 1,217 | 1,567 | -22% | (22) | -2% | (109) | -9% | 1.53 | 3.11 | 1.02 | 0.70 | 1.54 |
| Broadcom Corporation | BRCM-US | 4,490 | 4,658 | -4% | 201 | 4% | 65 | 1% | 3.57 | 1.12 | 0.86 | 1.07 | 1.39 |
| Microchip Technology Inc. | MCHP-US | 948 | 903 | 5% | 245 | 26% | 217 | 23% | 1.37 | 0.87 | 0.83 | 13.54 | 2.06 |
| Cypress Semiconductor Corporation | CY-US | 668 | 766 | -13% | (134) | -20% | (150) | -23% | 1.24 | 1.64 | 1.12 | 0.49 | 0.99 |
| Cavium Networks, Inc. | CAVM-US | 101 | 87 | 17% | (21) | -21% | (21) | -21% | 1.03 | 0.66 | 1.02 | 0.30 | 0.94 |
| Advanced Micro Devices, Inc. | AMD-US | 5,403 | 5,808 | -7% | (513) | -9% | 376 | 7% | 1.83 | 1.27 | 1.73 | 1.48 | 1.06 |

Fig. 7

Freescale Semiconductor, Inc.
Comparable Company Analysis (Pvt to Public)

| | | Qual Ranking 75% | Quant Ranking 25% | Total Ranking |
|---|---|---|---|---|
| Freescale | | | | |
| Infineon Technologies | IFX-XE | 0.70 | 3.00 | 1.28 |
| Texas Instruments Incorporated | TXN-US | 0.95 | 1.13 | 0.99 |
| Microchip Technology Inc. | MCHP-US | 0.45 | 2.00 | 0.84 |
| Analog Devices, Inc. | ADI-US | 0.45 | 1.88 | 0.81 |
| Renesas | 6723-TO | 0.65 | 1.12 | 0.77 |
| LSI Corporation | LSI-US | 0.50 | 1.50 | 0.75 |
| STMicroelectronics | STM-US | 0.70 | 0.83 | 0.73 |
| Atmel Corporation | ATML-US | 0.45 | 1.54 | 0.72 |
| Broadcom Corporation | BRCM-US | 0.45 | 1.39 | 0.69 |
| Intel Corporation | INTC-US | 0.65 | 0.70 | 0.66 |
| Cypress Semiconductor Corporation | CY-US | 0.35 | 0.93 | 0.50 |
| Advanced Micro Devices, Inc. | AMD-US | 0.20 | 1.06 | 0.41 |
| Cavium Networks, Inc. | CAVM-US | 0.30 | 0.54 | 0.36 |

Fig. 9

Multiple Valuation

| Comparable Company | Median CY 2009 | Target Financials | Ent. Value | Cash | Debt | Equity Value | Weighting | Estimated Equity Value | Estimated Enterprise Value |
|---|---|---|---|---|---|---|---|---|---|
| EV/Revenue | 0.17x | 3,508 | 608.75 | 1,191 | 7,474 | (5,674) | 54% | (3,072) | |
| EV/EBITDA | 9.23x | 2,251 | 20,778.64 | 1,191 | 7,474 | 14,496 | 23% | 3,277 | |
| P/E | 20.24x | 748 | | | | 15,142 | 23% | 3,522 | |
| Valuation Estimate | | | | | | | | 3,727 | 10,010 |
| Liquidity Discount | | | | | | | | 20% | 20% |
| TR Valuation Estimate | | | | | | | | 2,982 | 8,008 |
| Change from Investment | | | | | | | | | -55% |

Index Valuation

| | Mkt Cap Weighted Avg | | | | | Estimated Equity Value | Estimated Enterprise Value |
|---|---|---|---|---|---|---|---|
| | Investment Date | Value Date | % Change | | Investment | | |
| | 9/15/2006 | 6/30/2010 | -16.3% | | 17,704 | 8,533 | 14,816 |

Total Valuation

| Months since last financing | 46.1 | | | |
|---|---|---|---|---|
| | | Weighting | Estimated Equity Value | Estimated Enterprise Value |
| Multiple Valuation | | 100% | 2,982 | 8,008 |
| Index Valuation | | 0% | 8,533 | 14,816 |
| Estimated Valuation | | | 2,982 | 8,008 |
| Change from latest investment | | | | -54.8% |

PRIVATE COMPANY VALUATION

TECHNICAL FIELD

The present invention relates to valuing privately-held entities, and more particularly, to computer-implemented systems and methods for valuing privately-held entities based on publicly traded peer entities.

BACKGROUND

When investing in a privately-held company, or a fund that invests in privately-held companies, it is desirable to determine the current value of the company or companies within the fund. Valuations are currently provided by various financial professionals, but the process tends to be manual, time consuming, and the results vary widely as no standardized valuation methodology is adopted across the profession. For example, as a private company can have multiple investors, it is not uncommon for each investor to value the company differently, which creates ambiguity and hinders the investment decision making process.

Various techniques of valuing a private company involve a selection of publicly traded peer companies. Generally, the individual conducting the valuation uses a manual method of determining the peers. The method can be based on the individual's expertise with the industry, use of industry classification schemas, or searching in a financial information product or the Internet using general terms. Unfortunately, these methods tend to lead to inconsistent results. The inconsistent results can be caused by individuals not having complete information on actual peer comparison, using industry classifications that identify peer companies that aren't truly comparable, or individual decision making being biased by selecting companies that have higher or lower valuation multiples, intentionally or unintentionally.

Several techniques of valuing private companies include the use of merger or acquisition (M&A) data of comparable companies. While these techniques can be relevant in determining valuations when a company is being acquired, these techniques can provide inaccurate results for the current valuation of a company. The reason for the potential inaccuracy relates to the timing of the M&A information. In particular, the M&A information used in the analysis may occur over many different economic cycles, and these cycles may not be representative of the current cycle. As the purpose of a valuation is to derive the value of the company as if it were to trade today, use of merger and acquisition data can mislead current investors.

Another common method for valuing private companies is to calculate the current value of the projected future cash flows. This is a reliable method for companies where it is possible to accurately predict the future revenue growth and operating margins of a company out five to ten years. However, for many privately-held companies, the accuracy of these projections can be very low and produce misleading results. The projections also suffer from the manual process of intentional or unintentional bias.

Accordingly, there is a need for improved systems and techniques for valuing privately-held companies.

SUMMARY

Systems and techniques are disclosed to value privately-held companies, at least in part, on publicly traded companies. A value is computed for a privately-held company using a weighted average valuation multiple and a weighted average total return value associated with publicly traded companies. A confidence rating of the computed valuation is also computed.

Various aspects of the system relate to identifying comparable companies to a privately-held company and computing a value for the privately-held company.

For example, according to one aspect, a computer-implemented method includes identifying comparable companies to the privately-held company based on quantitative and qualitative data associated with the privately-held company, and computing a value for the privately-held company using a weighted average valuation multiple for each of the identified companies and a weighted average total return for each of the identified comparable companies. The method also includes generating a signal associated with the value, and transmitting the signal.

In one embodiment, the method includes computing a confidence rating for the computed value, and associating the confidence rating with the signal. The confidence rating may be based on a comparison rating associated with each of the identified comparable companies, the weighted average valuation multiple for each of the identified companies, and a number of identified comparable companies.

Identifying the comparable companies can include comparing qualitative and quantitative characteristics of the privately-held company to qualitative and quantitative characteristics of each of a plurality of publicly-traded companies, and identifying the comparable companies based on the comparison. In one embodiment, the method includes computing a qualitative ranking for each of the plurality of publicly-traded companies based on a comparison of qualitative data associated with each publicly-traded company to the qualitative data associated with the privately-held company, computing a quantitative ranking for each of the plurality of publicly-traded companies based on a comparison of quantitative data associated with each publicly-traded company to the quantitative data associated with the privately-held company, and computing the comparison rating for each of the plurality of publicly-traded companies by combining the computed qualitative ranking with the computed quantitative ranking.

In another embodiment, the method includes computing a total comparison score for the comparable companies by summing each comparison rating associated with each of the identified comparable companies, and computing a plurality of valuation multiples for each of the identified comparable companies. The method also can include computing a mean valuation multiple for each of the identified comparable companies by averaging the plurality of computed valuation multiples associated with each of the identified comparable companies, and computing the weighted average valuation multiple for each of the identified comparable companies by multiplying the computed mean valuation multiple by a percentage each comparison rating is of the total comparison score.

The method can also include multiplying a plurality of metrics associated with the privately-held company by each of the weighted average valuation multiples associated with the identified comparable companies, weighting each of the multiplied metrics by the accuracy score associated with each of the weighted average valuation multiples, and computing a first valuation value for the privately-held company by summing the weighted multiplied metrics. One of the plurality of metrics can include a financial metric or an operating metric associated with the privately-held company.

In yet another embodiment, the method includes computing a total return for each of the identified comparable companies using at least one of a stock price change, a dividend amount, and one or more corporate actions affecting the identified comparable company over a pre-defined period of time, computing the weighted average total return for each of the identified comparable companies by weighting each computed total return by the comparison rating associated with each of the identified comparable companies, and computing a second valuation value for the privately-held company by multiplying the computed implied valuation of the privately-held company by the weighted average total return for each of the identified comparable companies from the pre-defined period of time. The value of the privately-held company is then computed by weighting the first valuation value by a first discount value, weighting the second valuation value by a second discount value, and summing the weighed amounts.

A system, as well as articles that include a machine-readable medium storing machine-readable instructions for implementing the various techniques, are disclosed. Details of various embodiments are discussed in greater detail below.

Additional features and advantages will be readily apparent from the following detailed description, the accompanying drawings and the claims.

BRIEF DESCRIPTION OF THE DRAWINGS

FIG. 3 illustrates exemplary privately-held company information captured by the valuation system of FIG. 1.

FIGS. 4-5 illustrate exemplary business comparability ratings for comparable companies.

FIGS. 6-7 illustrate exemplary financial comparability ratings for comparable companies.

FIGS. 8-9 illustrate exemplary total ratings for comparable companies.

FIG. 10 illustrates an exemplary valuation for the privately-held company.

Like reference symbols in the various drawings indicate like elements.

DETAILED DESCRIPTION

Figure 1:
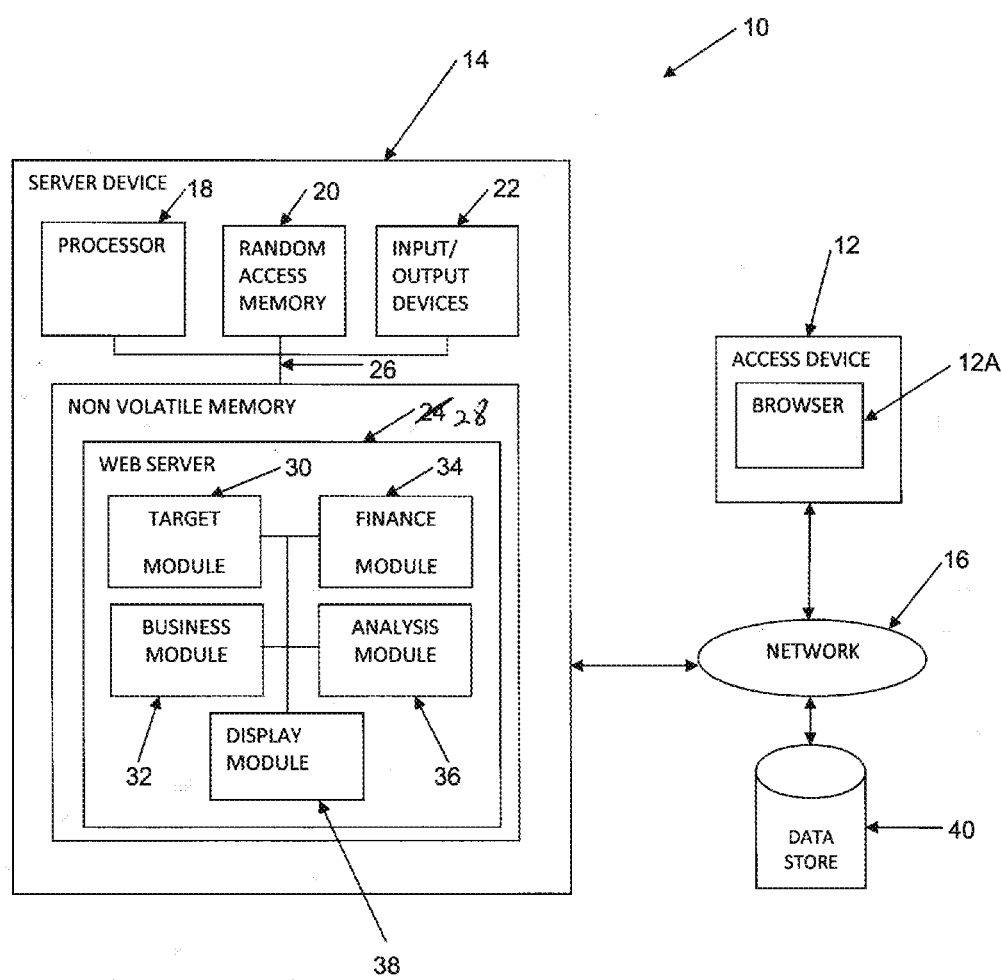
FIG. 1 is a schematic of an exemplary computer-based valuation system.

FIG. 1 shows a computer-based system for valuing a privately-held company, at least in part, on publicly traded companies. The system 10 is configured to compute a valuation for a privately-held company using a weighted average valuation multiple and a weighted average total return value associated with publicly traded companies. A confidence rating of the computed valuation is also computed.

As shown in FIG. 1, the system 10 is configured to include an access device 12 that is in communication with a server 14 over a network 16. The access device 12 can include a personal computer, laptop computer, or other type of electronic device, such as a cellular phone or Personal Digital Assistant (PDA). In one embodiment, for example, the access device 12 is coupled to I/O devices (not shown) that include a keyboard in combination with a pointing device such as a mouse for sending web page requests to the server 14. Preferably, memory of the access device 12 is configured to include a browser 12A that is used to request and receive information from the server 14. Although only one access device 12 is shown in FIG. 1, the system can support multiple access devices.

The network 16 can include various devices such as routers, servers, and switching elements connected in an Intranet, Extranet or Internet configuration. In some embodiments, the network 16 uses wired communications to transfer information between the access device 12 and the server 14. In another embodiment, the network 16 employs wireless communication protocols. In yet other embodiments, the network 16 employs a combination of wired and wireless technologies.

As shown in FIG. 1, in one embodiment, the server device 14 preferably includes a processor 18, such as a central processing unit ('CPU'), random access memory ('RAM') 20, input-output devices 22, such as a display device (not shown) and keyboard (not shown), and non-volatile memory 24, all of which are interconnected via a common bus 26 and controlled by the processor 18. As shown in the FIG. 1 example, in one embodiment, the non-volatile memory 24 is configured to include a web server 28 for processing requests from the access device.

The web server 28 is configured to send requested web pages to the browser 12A of the access device 12 in response to a web page request. The web server 28 communicates with the web browser 12A using one or more communication protocols, such as HTTP (Hyper Text Markup Language). In one embodiment, the web server 28 is configured to include the Java 2 Platform, Enterprise Edition ('J2EE') for providing a plurality of screens included in a user interface displayed on the browser 12A.

The web server 28 provides a run-time environment that includes software modules for valuing privately-held companies. As shown in the FIG. 1 example, in one embodiment, the run-time environment includes a target module 30 for accessing and gathering information associated with a privately-held company, a business module 32 for determining business comparability of publicly-traded companies to the privately-held company, a finance module 34 for determining financial comparability of publicly-traded companies to the privately-held company, an analysis module 36 for computing a valuation of the privately-held company and confidence rating of the privately-held company, and a display module 38 for displaying the computed valuation value and confidence rating on the browser 12a of the access device 12 I response to a request. Details of the software modules 30, 32, 34, 36, and 38 configured in the run-time environment are discussed in further detail below.

As shown in FIG. 1, the system 10 includes a data store 40 that is utilized by software modules 30, 32, 34, 36, and 38 to access and store information relating to private company valuations. In one embodiment, the data store 40 is a relational database. In another embodiment, the data store 40 is a directory server, such as a Lightweight Directory Access Protocol ('LDAP') server. In yet another embodiment, the data store 40 is a configured area in the non-volatile memory 24 of the device server 14. Although the data store 40 shown in FIG. 1 is connected to the network 16, it will be appreciated by one skilled in the art that the data store 40 can be distributed across various servers and be accessible to the server 14 over the network 16, or alternatively, coupled directly to the server 14, or be configured in an area of non-volatile memory 24 of the server 14.

It should be noted that the system 10 shown in FIG. 1 is one embodiment of the disclosure. Other system embodiments of the disclosure may include additional structures that are not shown, such as secondary storage and additional computational devices. In addition, various other embodiments of the disclosure include fewer structures than those shown in FIG. 1. For example, in one embodiment, the disclosure is implemented on a single computing device in a non-networked standalone configuration. Data input is communicated to the computing device via an input device, such as a keyboard and/or mouse. Data output of the system is communicated from the computing device to a display device, such as a computer monitor.

Figure 2:
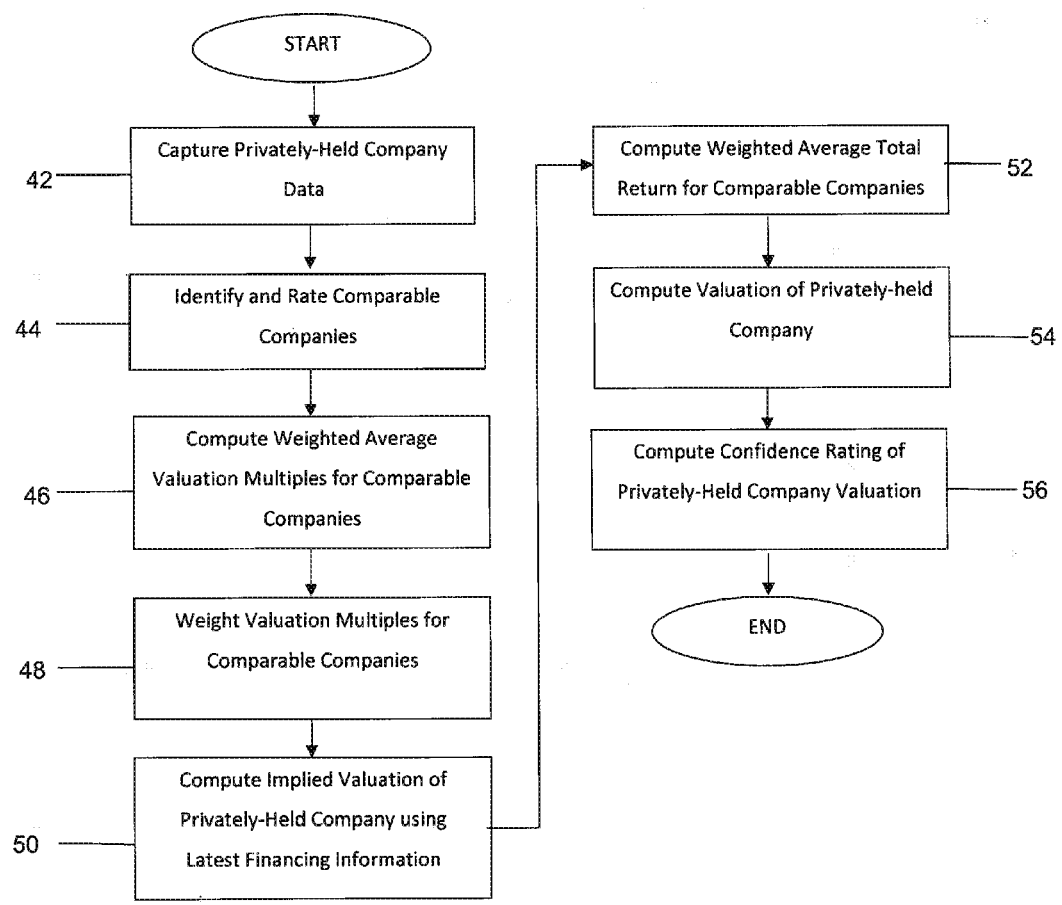
FIG. 2 illustrates an exemplary method for valuing a privately-held company.

Turning now to FIG. 2, a method of computing a value for a privately-held company using a computed weighted average valuation multiple and a computed weighted average total return for each of a plurality of publicly-traded companies is disclosed. As shown in FIG. 2, at step 42, the target module 30 first captures privately-held company data. In one embodiment, the privately-held company data is accessed from the data store 40 and includes data relating to a description of the privately-held company, recent and historical financial details (Income Statement, Balance Sheet) of the privately-held company, competitors of the privately-held company, as well as an industry classification of the privately-held company. An example of privately held company data is shown in connection with FIG. 3.

Next, as shown in FIG. 2 at step 44, comparable publicly-traded companies are identified and rated based on business comparability and financial comparability with the privately-held company. In one embodiment, the business module 32 rates publicly-traded companies using qualitative data associated with publicly-traded companies. The qualitative data describes factors that determine how comparable a publicly-traded companies is to the privately-held company based on industry, customer type and business model.

The finance module 34 rates publicly-traded companies using quantitative data (e.g., financial performance information). Example quantitative data used by the finance module 34 includes, but is not limited to, revenue, revenue growth, and profitability of publicly-traded companies. The analysis module 36 then combines both the quantitative and qualitative ratings to determine the optimal set of comparable companies to be used in the valuation, as described below.

In one embodiment, the process of identifying comparable companies differs by the stage of the privately-held company. For example, in one embodiment, identifying the comparable companies for a start-up company is different from identifying comparable companies for a mature, late stage company. Therefore, both the business module 32 and the finance module 34 use different factors to identify comparable companies. These factors are then weighted differently by the business module 32 and the finance module 34 based on the stage the privately-held company is in its business life cycle.

Figure 4:
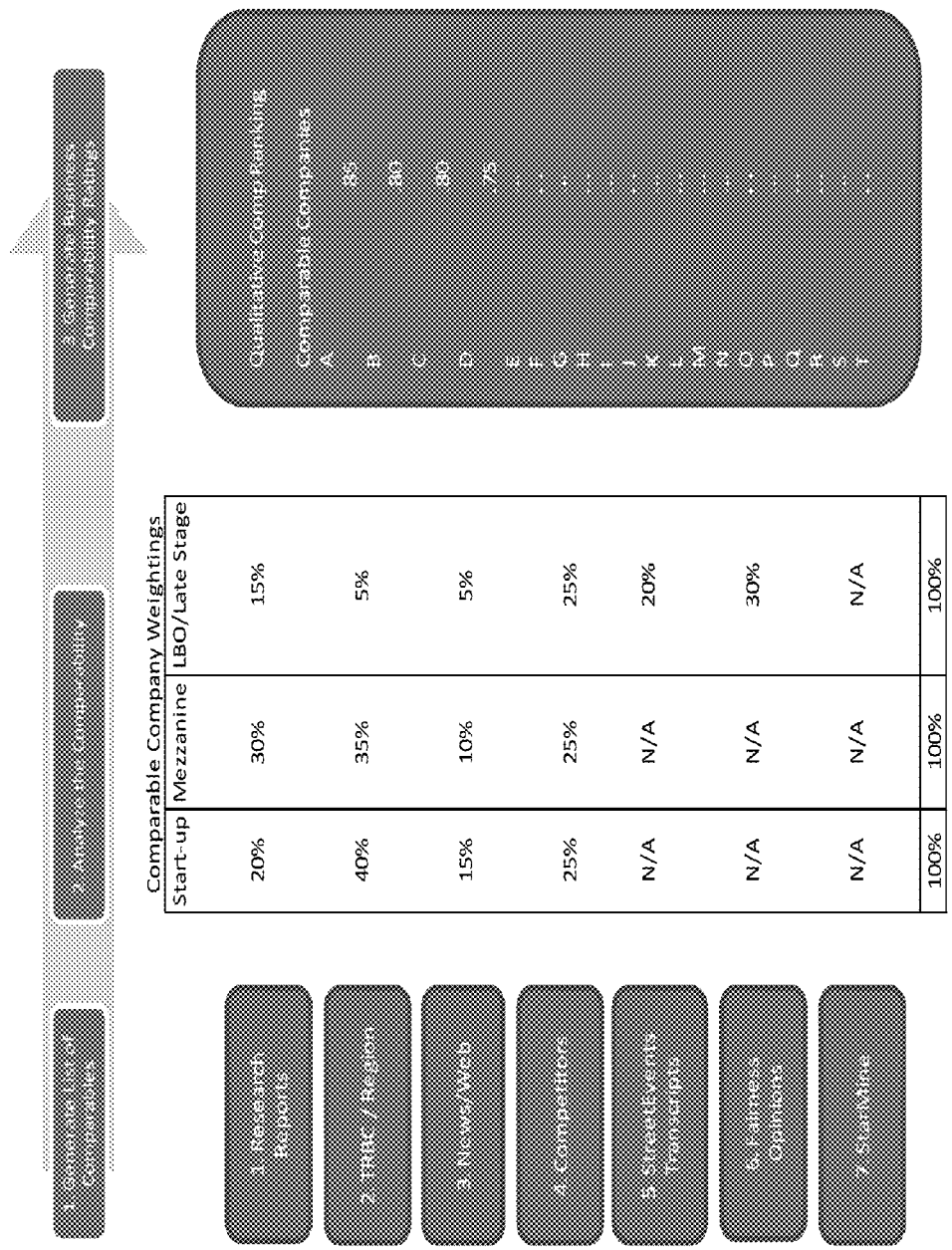

Example business comparability ratings computed by the business module 32 are shown in connection with FIG. 4-5. In one embodiment, as shown in FIGS. 4-5, data sources used by the business module 32 to identify the publicly-traded companies include, but are not limited to, broker research reports, business classification information, news and Internet information, competitor information, company transcript information, merger and acquisition (M&A) fairness opinions, and same equity research analyst coverage.

The business module 32 maintains a list of potential comparable companies to the privately-held company. In one embodiment, the business module 32 identifies all publicly-traded companies that appear in the same broker research reports as the privately-held company and adds the identified publicly-traded companies to a list of potential comparable companies. In one embodiment, the business module 32 is also configured to identify all publicly-traded companies that are in the same business classification as the privately-held company and add the identified companies to the list of potential comparable companies.

In one embodiment, the business module 32 is configured to access a database of competitor information. Publicly-traded companies that have the privately-held company listed as a competitor are identified as potential comparables and are added to the list of potential comparables by the business module 32.

Publicly-traded companies that appear in the same articles, both from traditional news sources and/or from Internet blogs, are also analyzed as potential company comparables and are added to the list of potential comparables by the business module 32.

In one embodiment, the business module 32 accesses Thomson Reuters StreetEvents Transcripts data to determine comparable companies. For example, in one embodiment, companies that are mentioned as competitors or comparable companies within the transcripts of the privately-held company or any other company are identified by the business module 32 as potential comparable companies. The business module 32 then adds these companies to the list of potential comparables.

In yet another embodiment, the business module 32 analyzes fairness opinions to identify comparable companies. Companies mentioned in fairness opinions are often cited as a result of a merger or major corporate action. Companies that have been public will often have been covered by equity research analysts. In one embodiment, the business module 32 is configured to use StarMine Corporation's process of determining company comparables by evaluating joint coverage of the privately-held company and other publicly-held companies.

By accessing and assessing the above qualitative data, the business module 30 produces the comparable company list that is used to value the privately-held company. FIGS. 3-4 show the different sources/factors and sample weightings used by the business module 32 to compute a business comparability rating (e.g., a qualitative ranking) for each publicly-traded company.

In one embodiment, the values for the factors are binary, so if the privately-held company is present in a transcript of a potential comparable company, or vice versa, the business module 32 sets a value of '1' for that factor. For example, referring to the FIG. 5 example, the list of companies shown is a join of all of the companies that appear in Research Reports, Thomson Reuters Business Classification (TRBC), News/Web, Thomson Reuters Competitors DB, Thomson Reuters StreetEvents Transcripts, and M&A Fairness Opinions. As shown in the FIG. 5 example for the Texas Instruments Incorporated entry, Target Semiconductor (the privately-held company being valued) appeared in the same Research Report, is in the same TRBC code, did not appear in the News searches, did appear in the Competitors DB, appeared in the same Transcript and appeared together in a Fairness Opinion. As such, for the Texas Instruments Incorporated entry, the business module 32 assigned a value of '1' for each of the factors where it appeared, and a value of '0' (shown as a blank in FIG. 5) for where Texas Instruments Incorporated did not appear. As shown in FIG. 5, based on the exemplary weightings, the business ranking score computed by the business module 32 for Texas Instruments Incorporated entry is '0.95'.

In another embodiment, where at least a portion of the qualitative data is included in a document, the business module 32 assigns a value of '1' to a publicly-traded company if there exists at least one instance where both the privately-held company and the publicly-traded company are mentioned in a document. In another embodiment, the business module 32 computes a business comparability rating for the publicly-traded company equal to the fraction of documents that include both the publicly-traded company and the privately-held company. For example, in one embodiment, the business module 32 computes the business comparability rating for a publicly-traded company as follows:

Score for text_source_$x$=(Number of document that contain publicly-traded company and privately-held company)/Number of documents that contain privately-held company company Business comparability Score for publicly-traded company=($a1$*isInSameSubIndustry+ $a2$*isInSameIndustry+ $a3$*isInSameIndustryGroup+ $a4$*isInSameSector+ $a5$*isInSameCompetitorGroup+ $a6$*score_text_source_1+ $a7$*score_text_source_2+ . . . +$aN$*score_text_source_$X$)

where $a1+a2+\ldots+aN=1$ and where isInSameSubIndustry is assigned value '1' if publicly-held company is in same 8-digit TRBC code ("sub-industry") as privately-held company, and assigned '0' otherwise, isInSameIndustry is assigned value '1' if publicly-held company is in same 6-digit TRBC code ("industry") as privately-held company, and assigned '0' otherwise, isInSameSector is assigned value '1' if publicly-held company is in same 2-digit TRBC code ("sector") as privately-held company, and assigned '0' otherwise.

The finance module 34 compares the financials (e.g., quantitative data) of the privately-held company to the financials of the comparable companies identified by the business module 32. The source for the financials is the financial statements of the privately-held company, as shown in connection with FIG. 3, and the financial statements for the publicly-traded companies. In one embodiment, the financials for the publicly-traded companies are accessible from Thomson Reuters Fundamental database.

In one embodiment, the finance module 34 compares the most relevant privately-held company financials to respective publicly-held company financials, and computes a financial ranking score (e.g., a quantitative ranking) based on the similarity of the amounts. For example, referring now to FIG. 6, example financial information includes, but is not limited to, revenue, revenue growth, operating margin and net margin. In some embodiments, additional financial information is added and some financial information may change depending on the privately-held company's industry.

To determine financial comparability, the finance module 34 normalizes financial information (e.g., metrics) associated with companies to a standard scale. For example, in one embodiment, the finance module 34 ranks all companies, including the privately-held company, and then computes an absolute value of the difference between the privately-held company rank less the comparable company rank. In another embodiment, the finance module 34 computes a difference of z-scores between the privately-held company and identified publicly-traded companies. In one embodiment, for each financial metric, the finance module 36 computes a standardized z-score value for each company using the following formula:

$Z$ Score value=financial metric for company−mean (financial metrics associated with comparable companies)/Standard deviation(financial metrics associated with financial metrics).

Figure 6:
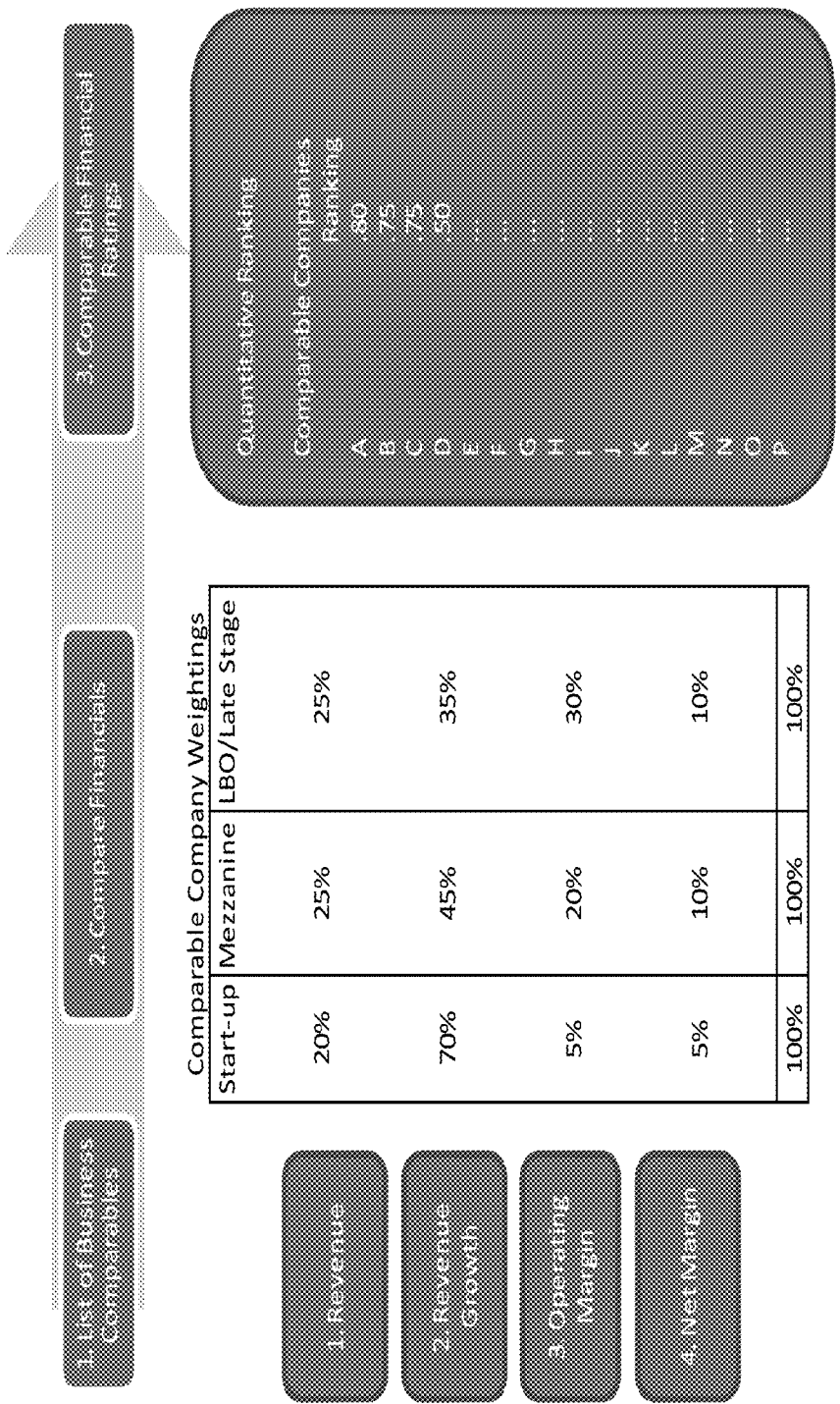

As shown in FIG. 6, in one embodiment, the finance module 34 is configured to apply different weights to each financial data point depending on the stage the privately-held company is in within the business life cycle. For example, as shown in FIG. 6, the finance module 34 weights revenue values of the publicly-traded company by twenty-percent (20%) if the privately-held company is a start-up company, but weights the revenue value of the publicly-traded company twenty-five percent (25%) if the privately-held company is considered a leveraged buyout (LBO) or late stage company. Example comparable company weightings based on business life cycle of the privately-held company are shown in FIG. 6.

In one embodiment, the both the business module 32 and the finance module 34 are configured to modify one or more of the qualitative data or quantitative data, respectively, associated with comparable companies. The modification can be based on an inflation rate, interest rate, exchange rate, financing rate, or combination thereof, at a particular point in time. The qualitative and quantitative data, as modified, are then used in the private-company valuation process, as described below.

Figure 8:
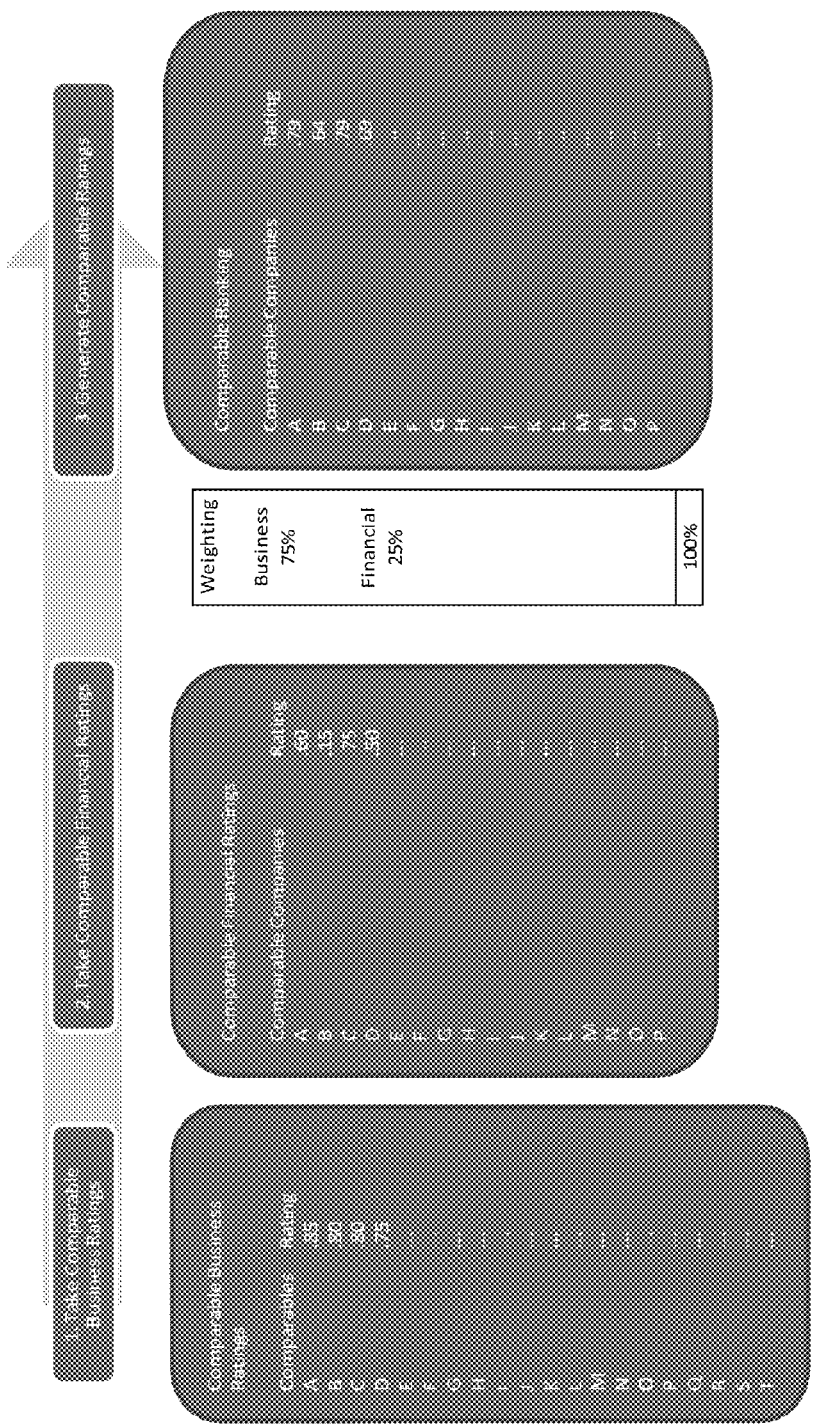

Referring now to FIGS. 8 and 9, in one embodiment, once the business module 32 identifies and computes the business comparability ranking for each of the publicly-traded companies, and the finance module 34 computes a financial comparability ranking for each of the publicly-traded companies, the analysis module 36 computes an overall comparability ranking (e.g., a comparison rating) for each of the publicly-traded companies. In one embodiment, the analysis module adds the computed business comparability ranking to the financial comparability ranking to compute the overall comparability ranking.

As shown in FIG. 8, in one embodiment, the analysis module 38 may also weight each of the business comparability rankings and financial comparability rankings prior to computing the overall comparability ranking. For example, as shown in FIG. 8, each business comparability ranking associated with each publicly-traded company is weighted seventy-five percent (75%) and each financial comparability ranking associated with each publicly-traded company is weighted twenty-five percent (25%) prior to combining with one another.

In one embodiment, the analysis module 36 reduces the number of comparable companies used to value the privately-held company by a fixed amount, such as selecting a top ten (10) companies. In another embodiment, the analysis module 36 reduces the number of comparable companies used to value the privately-held company based on the comparison rating of the comparable companies, such as selecting only those comparable companies with a comparison rating value of eighty ('80') or more.

Referring back to FIG. 2, once comparable companies are identified and rated 44, the analysis module 36 next computes weighted average valuation multiples for each of the identified comparable companies. The valuation multiples are computed using a company value, such as an Enterprise Value, divided by a financial or operating metric, such as Revenue. Valuation multiples used by the analysis module 36 may vary by industry. Example valuation multiples include, but are not limited to "Enterprise Value/Revenue", "Enterprise Value/ EBITDA", and "Price/Earnings". In one embodiment, the analysis module 36 computes the Enterprise.Value of a comparable company using the following formula:

Enterprise Value=Market Capitalization+Debt−Cash, where Market Capitalization=Shares Outstanding*Share Price.

Next, for each comparable company, the analysis module 36 computes an average of valuation multiple, which is then weighted by the overall comparable rating for each company. In one embodiment, the analysis module 36 performs weighting by totaling the ratings of all comparable companies and weights the individual comparable company's valuation multiple by a percentage the company's rating is of the total ratings.

In one embodiment, the analysis module 36 computes a total comparison score for the comparable companies by summing each comparison rating associated with each of the identified comparable companies, and computes a mean valuation multiple for each of the identified comparable companies by averaging a plurality of computed valuation multiples associated with each of the identified comparable companies.

Once the valuation multiples are weighted based on publicly-traded company comparability, in one embodiment, the analysis module 36 weights the valuation multiples based on an accuracy score associated with each valuation multiple in determining previous privately-held company valuations 48. In one embodiment, the analysis module 36 applies an equal weighting to the valuation multiples if they all have contributed equally to the accuracy of prior valuations. In another embodiment, the analysis module 36 weights the valuation multiples by the how dispersed the comparable company valuation multiples are around the mean valuation multiple. In particular, the analysis module 36 assigns a higher weighting to valuation multiples that are tightly consolidated around the computed mean than valuation multiples that are widely dispersed about the computed mean.

In yet another embodiment, the analysis module 36 computes the weighted average valuation multiple for each of the identified comparable companies by multiplying the computed mean valuation multiple by a percentage each comparison rating is of the total comparison score.

Next, the analysis module 36 computes an implied valuation of the privately-held company based on the latest financing information associated with the privately-held company 50. In one embodiment, the analysis module 36 computes the implied valuation by dividing the amount invested in the privately-held company by the percent of the company acquired. Advantageously, computing the implied valuation serves as a very good proxy for the company's valuation is that it was the most recent time an investor negotiated the price, generally in a competitive environment. Several methods of valuing companies in the prior art ignore this value when computing the value of privately-held companies.

In one embodiment, the analysis module 46 obtains details for the latest round of financing for the privately-held company from the data store 40. Latest financing information is important as the value of the privately-held company is based at least in part on the amount an investor paid for a percentage of the company. If there was a competitive process where external investors evaluated the privately-held company and proceeded with an investment, this is an extremely accurate valuation of the privately-held company. From the latest financing details, in one embodiment, the analysis module 36 computes the implied valuation of the privately-held company by dividing an amount of financing raised by the percent of the company acquired.

In the event there wasn't a competitive process for the latest round of financing or the privately-held company is funded by the founders and through free cash flow generated by the business, the analysis module 36 does not obtain the before-mentioned financing details. As such, the analysis module 36 does not factor the latest round of financing into the private-company company valuation.

Next, as shown in FIG. 2, the analysis module 36 computes a weighted average total return for each of the comparable companies 52. In one embodiment, the analysis module 36 first computes a total return for comparable companies from the date of the most recent financing of the privately-held company using at least one of a stock price change, a dividend amount, and one or more corporate actions affecting the identified comparable company over a pre-defined period of time. The analysis module 36 then computes the weighted average total return for each of the identified comparable companies by weighting each computed total return by the comparison rating associated with each of the identified comparable companies.

Next, the analysis module 36 computes a value for the privately-held company 54. In one embodiment, the analysis module 36 computes the value of the privately-held company using the computed weighted average valuation multiples and the computed weighted average total returns for the comparable companies.

To value the privately-held company based on weighted average valuation multiples, in one embodiment, the analysis module 36 multiplies a plurality of metrics associated with the privately-held company by each of the computed weighted average valuation multiples associated with the identified comparable companies. The analysis module 36 then weights each of the multiplied metrics by the accuracy score associated with each of the weighted average valuation multiples, and then computes a first valuation value for the privately-held company by summing the weighted multiplied metrics.

The analysis module 36 also computes a second valuation value based on the computed weighted average total returns. In one embodiment, the analysis module 36 computes the second valuation value for the privately-held company by multiplying the computed implied valuation of the privately-held company at the latest round of financing by the computed weighted average total return for the comparable companies from the date of the latest financing. As such, the second valuation value is weighed by a value based at least in part on a number of days since last financing of the privately-held company.

Once the first and second valuation values are computed by the analysis module 36, the analysis module 36 computes a value for the privately-held company using the first valuation value (e.g., valuation form the weighted average valuation multiples) and the second valuation value (e.g., the valuation from the weighted average total returns). In one embodiment, the value of the privately-held company is computed by the analysis module using the following formula:

$$\text{Privately-held value Company} = (\text{first valuation value} * \text{weight1}) + (\text{second valuation value} * \text{weight2})$$

where weight1 is based on the accuracy score computed for the weighted average valuation multiples, weight2 is based on the number of days since the last financing round of the privately-held company was completed; and the sum of weight1+weight2 equals 1.

In one embodiment, once the analysis module 36 computes the value of the privately-held company, the display module 38 displays the computed value in the browser 12A of the access device 12 in response to a request. FIG. 10 illustrates an example valuation computed by the analysis module 36 and displayed by the display module 38.

As shown in FIG. 2, once the analysis module 36 computes a value for the privately-held company, in one embodiment, the analysis module 36 computes a confidence rating for the computed valuation 56. The confidence rating of the company valuation is computed using the before-mentioned comparable company comparability ratings, the weightings of the comparable companies' valuation multiples to determine the overall confidence rating, and the number of comparable companies included in the analysis.

In one embodiment, the analysis module 36 computes the confidence rating using the following formulas:

$$\text{Normalized Variability} = \text{weighted\_StdDev}/\text{avg\_valuation}$$

where $$\text{weighted\_StdDev} = \sqrt{\text{sum}(\text{final\_weight\_for\_multiple}_i * (\text{valuation\_from\_multiple}_i - \text{avg\_valuation})^2)};$$

valuation_from_multiple$_i$=weighted_avg_multiple$_i$* privately-held company metric$_i$;

avg_valuation=simple average (valuation_from_multiple$_1$, valuation_from_multiple$_2$ . . . valuation_from_multiple$_i$)

In one embodiment, if the computed normalized variability is between one percent and ten percent (1%-10%), the analysis module 36 assigns a high value to the confidence rating. If the computed normalized variability is between ten percent and twenty percent (10%-20), the analysis module 36 assigns a medium value to the confidence rating, and if the computed normalized variability is greater than twenty percent (20%), the analysis module 36 assigns a low value to the confidence rating. In another embodiment, based on the computed normalized variability, the analysis module 36 assigns label, such as 'high', 'medium', and 'low', rather than values, to the confidence rating using a similar technique as described above.

In yet another embodiment, the analysis module 36 uses the number of valuation multiples used in the valuation, which is determined by the publicly-traded companies. For example, in one embodiment, for unprofitable publicly-traded companies, the analysis module 36 adds ten (10) percentage points to the computed normalized variability if EBITDA for a publicly-traded firm is less than or equal to zero (0), and adds five (5) percentage points to the computed normalized variability if EBIT is less than or equal to zero (0). Of course, it will be appreciated by one skilled in the art that the above percentage values are only exemplary and that other percentage values may be added or subtracted from the computed normalized variability by the analysis module 36.

In several embodiments, the analysis module 36 assigns a high value to the confidence rating if more weight is given to comparable companies that have a higher comparability rating. In addition, the analysis module 36 assigns a high value to the confidence rating if more publicly-traded companies are used in the valuation rather than less, assuming the companies included have the same comparability rating.

Once the analysis module 36 computes the confidence rating of the valuation, the display module 38 displays the confidence rating in the browser 12A of the access device 12 in response to a request.

Various features of the system may be implemented in hardware, software, or a combination of hardware and software. For example, some features of the system may be implemented in one or more computer programs executing on programmable computers. Each program may be implemented in a high level procedural or object-oriented programming language to communicate with a computer system or other machine. Furthermore, each such computer program may be stored on a storage medium such as read-only memory (ROM) readable by a general or special purpose programmable computer or processor, for configuring and operating the computer to perform the functions described above.

What is claimed is:

1. A computer-implemented method of valuing a privately-held company comprising:
   identifying comparable companies to the privately-held company based on quantitative and qualitative data associated with the privately-held company;
   computing a value for the privately-held company using a weighted average valuation multiple for each of the identified comparable companies and a weighted average total return for each of the identified comparable companies;
   generating a signal associated with the value; and
   transmitting the signal.

2. The method of claim 1, further comprising:
   computing a confidence rating for the computed value; and
   associating the confidence rating with the signal.

3. The method of claim 2, wherein the confidence rating is based on 1) a comparison rating associated with each of the identified comparable companies, 2) the weighted average valuation multiple for each of the identified companies, and 3) a number of identified comparable companies.

4. The method of claim 3, wherein identifying comparable companies comprises:
   comparing the qualitative and quantitative data of the privately-held company to qualitative and quantitative data of each of a plurality of publicly-traded companies; and
   identifying the comparable companies based on the comparison.

5. The method of claim 4, wherein identifying the comparable companies comprises:
   computing a qualitative ranking for each of the plurality of publicly-traded companies based on a comparison of the qualitative data associated with each publicly-traded company to the qualitative data associated with the privately-held company;
   computing a quantitative ranking for each of the plurality of publicly-traded companies based on a comparison of the quantitative data associated with each publicly-traded company to the quantitative data associated with the privately-held company; and
   computing the comparison rating for each of the plurality of publicly-traded companies by combining the computed qualitative ranking with the computed quantitative ranking.

6. The method of claim 5, wherein identifying the comparable companies is based on at least one of industry area, customer, and business model associated with each publicly-traded company.

7. The method of claim 5, wherein the qualitative data associated with each publicly-traded company comprises at least one of research reports, business classifications, news, competitor information, business transcripts, fairness opinions, and analyst reports associated with the publicly-traded company.

8. The method of claim 5, wherein the quantitative data associated with each publicly-traded company is based on financial information associated with the publicly-traded company.

9. The method of claim 5, comprising weighting the comparison rating based on business and financial criteria.

10. The method of claim 5, further comprising:
    determining a business stage for the privately-held company; and weighting the qualitative data associated with each publicly-traded company based on the business stage.

11. The method of claim 10, further comprising weighting the quantitative data associated with each publicly-traded company based on the business stage.

12. The method of claim 10, wherein the business life cycle stage is one of a 'Start-up', 'Mezzanine', and 'LBO/Late Stage'.

13. The method of claim 5, comprising applying pre-determined weights to the computed qualitative and quantitative rankings prior to combining.

14. The method of claim 3, comprising determining the number of identified comparable companies by comparing the comparison rating associated with each of the identified comparable companies to a threshold rating value.

15. The method of claim 3, wherein the number of identified comparable companies is a pre-determined number of companies.

16. The method of claim 2, further comprising:
computing a total comparison score for the comparable companies by summing each comparison rating associated with each of the identified comparable companies;
computing a plurality of valuation multiples for each of the identified comparable companies;
computing a mean valuation multiple for each of the identified comparable companies by averaging the plurality of computed valuation multiples associated with each of the identified comparable companies; and
computing the weighted average valuation multiple for each of the identified comparable companies by multiplying the computed mean valuation multiple by a percentage each comparison rating is of the total comparison score.

17. The method of claim 16, wherein the plurality of valuation multiples are based on dividing an enterprise value associated with each comparable company by one of revenue and EBITDA.

18. The method of claim 17, comprising computing the enterprise value by summing a market capitalization value associated with each identified company with a debt value associated with each comparable company, and subtracting a cash value associated with each comparable company from the summed amount.

19. The method of claim 18, further comprising computing the market capitalization value by multiplying a number of shares outstanding for the comparable company by a share price associated with the comparable company.

20. The method of claim 16, wherein at least one of the plurality of valuation multiples is based on a price/earnings ratio.

21. The method of claim 16, further comprising weighting each of the plurality of valuation multiples by an accuracy score associated with each of the valuation multiples, the accuracy score indicating a contribution of each valuation multiple to determining the value of the privately-held company.

22. The method of claim 21, wherein the accuracy score is substantially similar across the plurality of valuation multiples.

23. The method of claim 21, wherein the accuracy score is based on a difference value between a valuation multiple value and the computed mean valuation multiple.

24. The method of claim 21, further comprising:
multiplying a plurality of metrics associated with the privately-held company by each of the weighted average valuation multiples associated with the identified comparable companies;
weighting each of the multiplied metrics by the accuracy score associated with each of the weighted average valuation multiples; and
computing a first valuation value for the privately-held company by summing the weighted multiplied metrics.

25. The method of claim 24, wherein one of the plurality of metrics includes a financial metric or an operating metric.

26. The method of claim 16, further comprising:
accessing financing information associated with the privately-held company, the financing information indicating a percentage of the privately-held company acquired and an amount paid for the percentage; and
computing an implied valuation for the privately-held company by dividing the amount paid by the percentage.

27. The method of claim 26, further comprising:
computing a total return for each of the identified comparable companies using at least one of a stock price change, a dividend amount, and one or more corporate actions affecting the identified comparable company over a pre-defined period of time;
computing the weighted average total return for each of the identified comparable companies by weighting each computed total return by the comparison rating associated with each of the identified comparable companies; and
computing a second valuation value for the privately-held company by multiplying the computed implied valuation of the privately-held company by the weighted average total return for each of the identified comparable companies from the pre-defined period of time.

28. The method of claim 27, wherein computing the value for the privately-held company comprises:
weighting the first valuation value by a first weight value;
weighting the second valuation value by a second weight value; and
summing the weighted amounts.

29. The method of claim 28, wherein the second weight value is based at least in part on a number of days since last financing of the privately-held company and the first weight value is based at least in part on an accuracy score associated with the weighted average valuation multiples.

30. The method of claim 28, wherein the first and second weight values sum to a value of one.

31. A computing device comprising:
a processor;
a memory operatively coupled to the processor, the memory storing instructions that, in response to receiving a request, cause the processor to:
identify comparable companies to the privately-held company based on quantitative and qualitative data associated with the privately-held company;
compute a value for the privately-held company using a weighted average valuation multiple for each of the identified comparable companies and a weighted average total return for each of the identified comparable companies;
generate a signal associated with the value; and
transmit the signal.

32. The computing device of claim 31, wherein the memory stores instructions that, in response to receiving the request, cause the processor to:
compute a confidence rating for the computed value; and
associate the confidence rating with the signal.

33. The computing device of claim 32, wherein the confidence rating is based on 1) a comparison rating associated with each of the identified comparable companies, 2) the weighted average valuation multiple for each of the identified companies, and 3) a number of identified comparable companies.

34. The computing device of claim 33, wherein the memory stores instructions that, in response to receiving the request, cause the processor to:
   compare the qualitative and quantitative data of the privately-held company to qualitative and quantitative data of each of a plurality of publicly-traded companies; and
   identify the comparable companies based on the comparison.

35. The computing device of claim 34, wherein the memory stores instructions that, in response to receiving the request, cause the processor to:
   compute a qualitative ranking for each of the plurality of publicly-traded companies based on a comparison of the qualitative data associated with each publicly-traded company to the qualitative data associated with the privately-held company;
   compute a quantitative ranking for each of the plurality of publicly-traded companies based on a comparison of the quantitative data associated with each publicly-traded company to the quantitative data associated with the privately-held company; and
   compute the comparison rating for each of the plurality of publicly-traded companies by combining the computed qualitative ranking with the computed quantitative ranking.

36. The computing device of claim 35, wherein the comparable companies are based on at least one of industry area, customer, and business model associated with each publicly-traded company.

37. The computing device of claim 35, wherein the qualitative data associated with each publicly-traded company comprises at least one of research reports, business classifications, news, competitor information, business transcripts, fairness opinions, and analyst reports associated with the publicly-traded company.

38. The computing device of claim 35, wherein the quantitative data associated with each publicly-traded company is based on financial information associated with the publicly-traded company.

39. The computing device of claim 35, wherein the memory stores instructions that, in response to receiving the request, cause the processor to weight the comparison rating based on business and financial criteria.

40. The computing device of claim 35, wherein the memory stores instructions that, in response to receiving the request, cause the processor to:
   determine a business stage for the privately-held company; and
   weight the qualitative data associated with each publicly-traded company based on the business stage.

41. The computing device of claim 40, wherein the memory stores instructions that, in response to receiving the request, cause the processor to weight the quantitative data associated with each publicly-traded company based on the business stage.

42. The computing device of claim 40, wherein the business life cycle stage is one of a 'Start-up', 'Mezzanine', and 'LBO/Late Stage'.

43. The computing device of claim 35, wherein the memory stores instructions that, in response to receiving the request, cause the processor to apply pre-determined weights to the computed qualitative and quantitative rankings prior to combining.

44. The computing device of claim 33, wherein the memory stores instructions that, in response to receiving the request, cause the processor to determine the number of identified comparable companies by comparing the comparison rating associated with each of the identified comparable companies to a threshold rating value.

45. The computing device of claim 33, wherein the number of identified comparable companies is a pre-determined number of companies.

46. The computing device of claim 32, wherein the memory stores instructions that, in response to receiving the request, cause the processor to:
   compute a total comparison score for the comparable companies by summing each comparison rating associated with each of the identified comparable companies;
   compute a plurality of valuation multiples for each of the identified comparable companies;
   compute a mean valuation multiple for each of the identified comparable companies by averaging the plurality of computed valuation multiples associated with each of the identified comparable companies; and
   compute the weighted average valuation multiple for each of the identified comparable companies by multiplying the computed mean valuation multiple by a percentage each comparison rating is of the total comparison score.

47. The computing device of claim 46, wherein the plurality of valuation multiples are based on dividing an enterprise value associated with each comparable company by one of revenue and EBITDA.

48. The computing device of claim 47, wherein the memory stores instructions that, in response to receiving the request, cause the processor to compute the enterprise value by summing a market capitalization value associated with each identified company with a debt value associated with each comparable company, and subtracting a cash value associated with each comparable company from the summed amount.

49. The computing device of claim 48, wherein the memory stores instructions that, in response to receiving the request, cause the processor to compute the market capitalization value by multiplying a number of shares outstanding for the comparable company by a share price associated with the comparable company.

50. The computing device of claim 46, wherein at least one of the plurality of valuation multiples is based on a price/earnings ratio.

51. The computing device of claim 46, wherein the memory stores instructions that, in response to receiving the request, cause the processor to weight each of the plurality of valuation multiples by an accuracy score associated with each of the valuation multiples, the accuracy score indicating a contribution of each valuation multiple to determining the value of the privately-held company.

52. The computing device of claim 51, wherein the accuracy score is substantially similar across the plurality of valuation multiples.

53. The computing device of claim 51, wherein the accuracy score is based on a difference value between a valuation multiple value and the computed mean valuation multiple.

54. The computing device of claim 40, wherein the memory stores instructions that, in response to receiving the request, cause the processor to:
   multiply a plurality of metrics associated with the privately-held company by each of the weighted average valuation multiples associated with the identified comparable companies;
   weight each of the multiplied metrics by the accuracy score associated with each of the weighted average valuation multiples; and compute a first valuation value for the privately-held company by summing the weighted multiplied metrics.

55. The computing device of claim 54, wherein one of the plurality of metrics includes a financial metric or an operating metric.

56. The computing device of claim 46, wherein the memory stores instructions that, in response to receiving the request, cause the processor to:
   access financing information associated with the privately-held company, the financing information indicating a percentage of the privately-held company acquired and an amount paid for the percentage; and
   compute an implied valuation for the privately-held company by dividing the amount paid by the percentage.

57. The computing device of claim 56, wherein the memory stores instructions that, in response to receiving the request, cause the processor to:
   compute a total return for each of the identified comparable companies using at least one of a stock price change, a dividend amount, and one or more corporate actions affecting the identified comparable company over a pre-defined period of time;
   compute the weighted average total return for each of the identified comparable companies by weighting each computed total return by the comparison rating associated with each of the identified comparable companies; and
   compute a second valuation value for the privately-held company by multiplying the computed implied valuation of the privately-held company by the weighted average total return for each of the identified comparable companies from the pre-defined period of time.

58. The computing device of claim 57, wherein the memory stores instructions that, in response to receiving the request, cause the processor to:
   weight the first valuation value by a first weight value;
   weight the second valuation value by a second weight value; and
   sum the weighted amounts.

59. The computing device of claim 58, wherein the second weight value is based at least in part on a number of days since last financing of the privately-held company and the first weight value is based at least in part on an accuracy score associated with the weighted average valuation multiples.

60. The computing device of claim 58, wherein the first and second weight values sum to a value of one.

61. A computer server including a processor and memory storing instructions that, in response to receiving a request, cause the processor to:
   identify comparable companies to the privately-held company based on quantitative and qualitative data associated with the privately-held company;
   compute a value for the privately-held company using a weighted average valuation multiple for each of the identified comparable companies and a weighted average total return for each of the identified comparable companies;
   generate a signal associated with the value; and
   transmit the signal.

62. A computer-implemented method of valuing a privately-held company comprising:
   comparing qualitative and quantitative data of the privately-held company to qualitative and quantitative data of each of a plurality of publicly-traded companies;
   modifying one of the qualitative data or the quantitative data of the plurality of publicly traded companies based on an inflation rate, interest rate, exchange rate, financing rate, or combination thereof, at a particular point in time;
   computing a value for the privately-held company using one or more of the modified qualitative data and quantitative data;
   generating a signal associated with the computed value; and
   transmitting the signal.

* * * * *